UNITED STATES PATENT OFFICE.

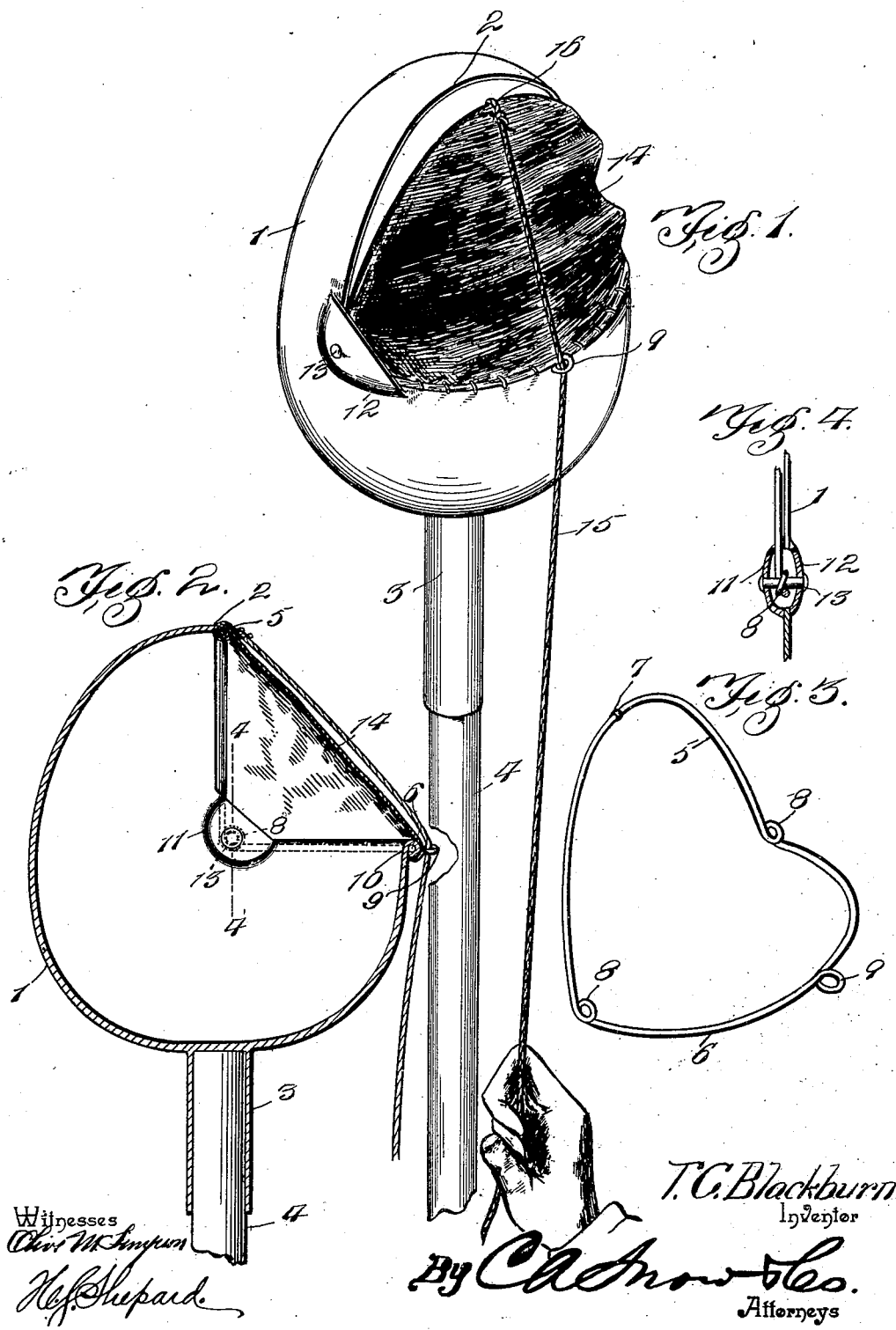

THOMAS C. BLACKBURN, OF BOONE, NORTH CAROLINA.

FRUIT-GATHERER.

SPECIFICATION forming part of Letters Patent No. 676,411, dated June 18, 1901.

Application filed February 21, 1901. Serial No. 48,338. (No model.)

*To all whom it may concern:*

Be it known that I, THOMAS C. BLACKBURN, a citizen of the United States, residing at Boone, in the county of Watauga and State of North Carolina, have invented a new and useful Fruit-Gatherer, of which the following is a specification.

This invention relates to fruit gatherers or pickers, and has for its object to provide an improved device of this character which is arranged to facilitate the picking of fruit at a considerable elevation and to collect the picked fruit, so as to prevent the same from falling to the ground and becoming bruised and damaged. It is furthermore designed to facilitate the manipulation of the movable parts of the device, so as to engage the same with the fruit to effectively remove the latter from the tree.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of a fruit picker or gatherer constructed in accordance with the present invention. Fig. 2 is a central longitudinal sectional view thereof. Fig. 3 is a detail perspective view of the spring-jaw. Fig. 4 is a detail sectional view taken on the line 4 4 of Fig. 2 to illustrate the pivotal mounting of the spring-jaw.

Like characters of reference designate corresponding parts in all of the figures of the drawings.

Referring to the drawings, 1 designates the hollow body of the device, which is formed of sheet metal and is substantially in the shape of a prolate spheroid, having one of the upper quarter-sections cut away to form an entrance-opening into the body, which forms a receptacle for containing the picked fruit. The upper edge 2 of the mouth or entrance-opening forms the fixed jaw of the device. At the bottom of the body there is provided a pendent sleeve or socket 3, that is open at its lower end for the reception of a removable handle 4 of suitable length, it being understood that it is designed to provide a plurality of handles of different lengths for interchangeable connection with the body, so as to facilitate the manipulation of the device at different heights.

Coöperating with the fixed jaw is an inverted substantially U-shaped spring-jaw 5, which corresponds to the size and shape of the fixed jaw and normally lies in contact therewith. This spring-jaw is formed from a single length of spring-wire, which is first bent intermediate of its ends into substantially U shape to form the fixed member 6, as shown in Fig. 3, after which the side pieces are bent intermediate of their ends in the same direction toward the fixed member and have their terminals bowed laterally across the fixed member in opposite directions and joined, as indicated at 7, thereby forming the spring-jaw. At the opposite angles between the sides of the spring-jaw and the fixed member the wire is bent into the corresponding spring-coils 8 to give elasticity to the jaw. Also an eye or loop 9 is twisted at a point midway between the opposite ends of the fixed member.

When the spring-jaw is applied to the body of the device, the fixed member is fitted to the lower side of the entrance-opening or mouth and the lower marginal edge thereof is folded over or beaded upon the fixed member, as indicated at 10 in Fig. 2 of the drawings, thereby fixing the member to the body and also stiffening the lower edge of the opening. Each spring-coil 8 is located in the angle between the adjacent upper and lower edge portions of the entrance-opening and is also received within a socket formed by inner and outer plates 11 and 12, secured to the body and extending across the aforementioned angle. A suitable pivot-pin 13 passes through the bearing-eye formed by the spring-coil and is connected to the plates, whereby the spring-jaw is pivotally mounted upon the body, so as to effectually coöperate with the fixed jaw.

A flexible covering of leather, cloth, or other suitable material 14 has its opposite edges connected to the spring-jaw and the lower edge of the opening in the body, respectively, so that in the normal position of the spring-jaw the flexible cover closes the entrance-opening and at the same time permits of the jaw being drawn outwardly away from the fixed jaw to uncover the entrance-opening.

For the manipulation of the movable jaw there is provided a cord 15, which reaches from the outer end of the handle to the middle portion of the movable jaw, to which it is connected, as at 16, in any suitable manner, with the intermediate portion of the cord passing loosely through the guide 9, so that by pulling downwardly or outwardly upon the cord the spring-jaw will be drawn away from the fixed jaw to permit of the reception of a fruit within the hollow body, after which the cord is released and the jaw springs back into its normal position, thereby gripping the stem of the fruit between the two jaws, and by giving the handle a quick jerk the fruit will be pulled from the tree and deposited in the body or receptacle.

What is claimed is—

1. A fruit-picker, comprising a substantially spherical hollow body, having one of the upper quarter-sections removed to form an entrance-opening, the upper edge of the opening forming a fixed jaw, an inverted substantially U-shaped pivotal jaw coöperating with the fixed jaw and formed integrally with a substantially horizontal fixed member from a single length of spring-wire, which is bent into substantially U shape to form the fixed member, the sides thereof being bent upwardly and bowed inwardly in opposite directions across the member and joined to form the inverted-U-shaped spring-jaw, there being corresponding spring-coils in the angles between the fixed member and the spring-jaw, and a guide-loop formed intermediate of the ends of the fixed member, the latter being applied to the lower edge of the entrance-opening, and said edge being folded over upon the member, the spring-coils being located in the angles between the upper and lower edges of the entrance-opening, pivot-pins carried by the body and projecting through the respective spring-coils to pivotally mount the spring-jaw, and a cord connected to the spring-jaw and passed loosely through the guide-loop of the fixed member.

2. A fruit-picker, comprising a hollow substantially spherical body, having one of the upper quarter-sections removed to form an entrance-opening, and provided upon its lower side with a pendent handle-receiving socket, an inverted substantially U-shaped jaw coöperating with the upper edge of the entrance-opening, and having its opposite ends pivotally mounted at the respective inner corners of the entrance-opening, a flexible cover connected to the pivotal jaw and the lower edge of the entrance-opening, a spring for normally closing the pivotal jaw toward the fixed jaw, an operating-cord connected to the intermediate portion of the pivotal jaw, and a guide carried by the body, located below the entrance-opening and constructed for the loose reception of the cord.

3. A fruit-picker, comprising a hollow substantially spherical body, having one upper quarter-section removed to form an entrance-opening, of which the upper edge forms a fixed jaw, pairs of plates embracing the opposite edges of the opening at their respective points of intersection and forming sockets, an inverted substantially U-shaped movable jaw having its opposite ends received within the respective sockets, pivot-pins extending transversely across the respective sockets and mounting the movable jaw, a flexible cover connected to the movable jaw and the lower edge of the opening, and means for manipulating the movable jaw.

In testimony that I claim the foregoing as my own I have hereto affixed my signature in the presence of two witnesses.

THOMAS C. BLACKBURN.

Witnesses:
J. M. MAY,
M. B. BLACKBURN.